Patented Sept. 17, 1946

2,407,833

UNITED STATES PATENT OFFICE 2,407,833

METHOD OF MANUFACTURING ARTICLES FROM FIBROUS MATERIAL

Bruno Jablonsky, Waddon, Croydon, England

Application June 1, 1944, Serial No. 538,337
In Great Britain April 30, 1943

6 Claims. (Cl. 154—126)

This invention relates to the manufacture of articles from fibrous material which is bonded together by an adhesive under heat in a high frequency electric field, it may be with the application of pressure, and has for its object to provide a method of controlling the heat which is generated at various points or portions of the same article. The object of the invention from another aspect is to use materials of different electric loss factors at the different points or portions of such an article for the said purpose.

Figure 1:
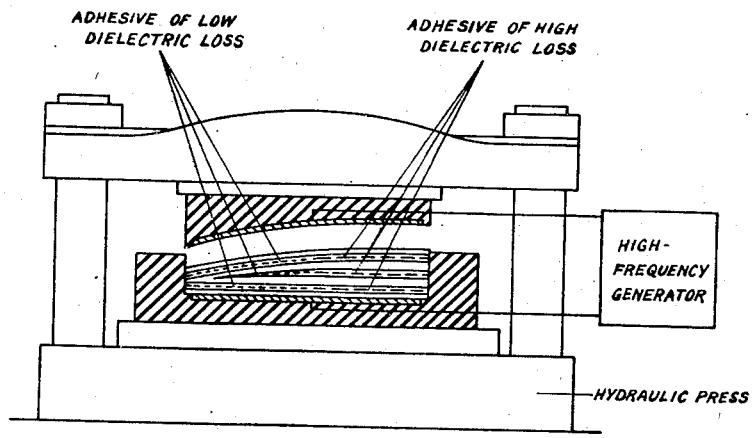
Figure 2:
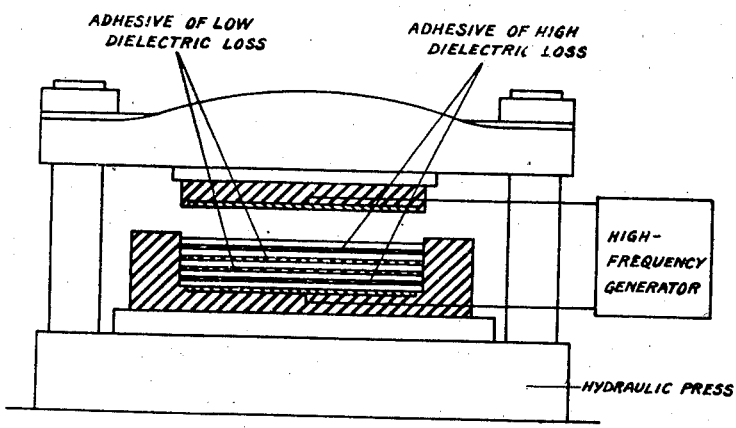

In the accompanying drawing,

Fig. 1 illustrates the positioning, in a press, of an assemblage for laminating a shaped article, the assemblage to be laminated by the process disclosed in this application, said assemblage varying in thickness, and Fig. 2 illustrates an assemblage with parallel surfaces to be laminated by said process, said assemblage positioned in a press.

As is known in the art, high frequency heating makes use of the fact that electric losses obtaining in a body situated in a high frequency field are converted into heat. Such electric losses can comprise dielectric losses obtaining in a material which is not an electric conductor in the ordinary sense, ohmic losses in a material which is not an ideal insulator, eddy current losses in material which is an electric conductor, hysteresis losses in material which is ferromagnetic, or a combination of two or more of these losses. The term electric loss will therefore be used in this specification to cover any one or a combination of these losses.

Furthermore the term "in a high frequency electric field" in this specification is meant to cover all phenomena which can be caused by electrodes either in contact with or arranged at a distance from the body to be treated, the electrodes being connected to the poles of a source of high frequency current.

As is well known in the art, the main advantage of high frequency heating is that heat is generated inside the article. It has been found however by the inventor that in many cases an additional control is desirable which permits to equalise, or to differentiate the heat generation at individual points or portions of an article.

If for instance a homogeneous article with parallel surfaces (see Fig. 2) is placed in a high frequency field between parallel electrodes a certain amount of heat is generated in a certain portion near the surface of the article and the same quantity of heat is generated in a portion of the same volume in the interior of the article. Due to the cooling effect, however, of the ambient air, metal electrodes, press tools and the like, which are in contact with its surface, the temperature rise in the interior of the article exceeds the temperature rise near its surface as the heat generated per unit of volume is equal throughout the whole article. This drawback is overcome according to the invention by using a material of a high electric loss factor near the surface of the article and a material of relatively lower loss factor for the interior portion of the article thus obviating insufficient heating at the surface and over-heating inside the article.

The invention can also be applied with advantage to shaped articles (see Fig. 1). If a homogeneous article of varying cross sectional area is placed between electrodes bearing against its surfaces to produce a high frequency field in the article the heat generation per unit of volume at the thicker portion of the article is smaller than that at the thinner portion of the article due to the lower capacity per unit of surface at the thicker cross sections. For this reason and also because more heat is required to heat a thicker cross section than to heat a thinner cross section to the same temperature it is desirable to alter the conditions so that the heat generated per unit of volume is greater at the thicker cross sections than at the thinner cross sections. Another object of this invention therefore is to use at the thicker cross sections a material, e. g. an adhesive, whose electric loss is considerably higher than the electric loss of the material, e. g. the adhesive, used for the thinner cross sections of the article.

The electric loss at certain points or portions of an article can be increased by using a moulding material, a fibrous material or an adhesive having a high electric loss factor, or by adding to the moulding material, to the adhesive or to the fibrous material a substance of high electric loss factor. Such substances are known in the art. They may comprise carbonaceous matter, graphite, carbon black, acetylene black and the like, or they may comprise an electrolite or ionogen, e. g. an organic acid or a salt, or they may comprise very fine metal particles.

The fibrous material may be of mineral, animal or vegetable nature and can be used in the form of loose fibres or as laminae, e. g. wood laminae, paper, textile fabric, pulp and the like.

The adhesive may be a natural glue or resin, or a synthetic adhesive of a thermosetting or of a thermoplastic type, a synthetic rubber or the like, or a mixture of two or more of these materials. The adhesive may be applied by spraying, brushing, dipping or impregnating the fibrous material, or by interleaving fibrous laminae with solid films of adhesive. Such films may contain fibrous fillers, or an article may be built up with laminae in which an adhesive is incorporated during their manufacturing process, e. g. in a paper machine.

In an embodiment of the invention a thermoplastic adhesive of low electric loss factor is used between the internal layers of fibrous laminae or in the interior of a body built up with loose fibres and a high loss thermosetting adhesive is used near the surface of the article.

In another embodiment an article is built up with fibrous laminae of different thickness, an adhesive of high electric loss factor being used for bonding together the thick laminae and an adhesive of relatively lower electric loss factor being used for bonding together the thinner laminae of the article.

In yet another embodiment an article is built up with long laminae between which shorter laminae are interleaved to increase the thickness or density of a certain portion, e. g. the root of an air screw blade, a high electric loss adhesive being used for bonding the short laminae and a relatively lower electric loss adhesive for bonding the longer laminae.

In yet another embodiment an article is built up with boards consisting of bonded fibrous laminae. The bonding of the boards and it may be the bonding of the laminae to form the boards are carried out under heat in a high frequency electric field with or without pressure and according to this invention a low electric loss adhesive is used for uniting the laminae to form the boards and an adhesive of relatively higher electric loss factor is used for uniting the boards to form the article. The frequency of a field which is used in connection with the invention can be in the range of megacycles per second, a valve generator can be used as source of high frequency current, and the aggregate or average heating effect can be controlled by varying the frequency, the voltage or the amperage of the high frequency current, or by varying the distance between the electrodes, as is known in the art.

Metallic press tools can serve as electrodes between which a high frequency field is produced, or the press tools can be made of a material which is not an electric conductor and thin electrodes, e. g. of metal foil can be provided between the press tools and the article as described in my co-pending patent application, filed August 13, 1943, Ser. No. 498,526.

Up to now it has been thought that very high frequencies are essential if the heat required for bonding a body of fibrous material is to be generated by the electric losses caused in the said body. It will be understood, however, that the frequency of the electric currents can be considerably reduced, even to low frequencies and in the extreme case to direct current, if the additional substance is chosen according to this invention to increase the losses so that they suffice for the heat treatment under low frequency conditions. For instance a metallic conductor may be chosen which affords a more or less continuous conducting path for electric currents in the fibrous body. The effect of such substances is similar to the effect of heating elements forming an integral part of the fibrous body, like wire netting interleaved with such a body. The invention therefore also comprises the use and arrangement of such substances in connection with electric fields or currents which are not high frequency fields or high frequency currents.

I claim:

1. Method of manufacturing shaped articles from fibrous material which is bonded together by an adhesive under pressure and heat in a high frequency electric field, wherein an adhesive of high electric loss factor is used at thicker cross sections of an article and an adhesive of relatively lower electric loss factor is used at thinner cross sections of the article.

2. Method of manufacturing articles from fibrous material which is bonded together by an adhesive under pressure and heat in a high frequency electric field, where an adhesive of a high electric loss factor is used near the surface of an article and an adhesive of relatively lower electric loss factor is used for the interior portion of the article.

3. Method of making articles from fibrous material which is bonded together by an adhesive under heat in a high frequency field wherein adhesives of different electric loss factor are used for bonding together the fibrous material at different points or portions of the articles.

4. Method of manufacturing articles from fibrous material which is bonded together by an adhesive under electrically generated heat wherein adhesives of different electric loss factor are used for bonding together the fibrous material at different points or portions of the articles.

5. Method of manufacturing articles from fibrous material which is bonded together by an adhesive under electrically generated heat and under pressure wherein adhesives of different loss factor are used for bonding together the fibrous material at different points or portions of the articles.

6. Method of manufacturing articles from fibrous material which is bonded together by an adhesive under heat in a high frequency field and under pressure wherein adhesives of different electric loss factor are used for bonding together the fibrous material at different points or portions of the articles.

BRUNO JABLONSKY.